(12) United States Patent
De Leon et al.

(10) Patent No.: US 8,502,879 B2
(45) Date of Patent: Aug. 6, 2013

(54) CAMERA SYSTEM AND METHOD FOR TAKING PHOTOGRAPHS THAT CORRESPOND TO USER PREFERENCES

(75) Inventors: David De Leon, Lund (SE); Johan Thoresson, Gothenburg (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 393 days.

(21) Appl. No.: 12/935,459

(22) PCT Filed: May 26, 2010

(86) PCT No.: PCT/IB2010/001247
§ 371 (c)(1),
(2), (4) Date: Sep. 29, 2010

(87) PCT Pub. No.: WO2011/148212
PCT Pub. Date: Dec. 1, 2011

(65) Prior Publication Data
US 2011/0292248 A1    Dec. 1, 2011

(51) Int. Cl.
*H04N 5/228* (2006.01)

(52) U.S. Cl.
USPC .................................. 348/222.1; 348/231.3

(58) Field of Classification Search
USPC .................... 348/222.1, 231.99, 231.1–231.9
See application file for complete search history.

(56) References Cited

U.S. PATENT DOCUMENTS

| 2008/0192129 A1 | 8/2008 | Walker et al. |
| 2009/0284621 A1 | 11/2009 | Oks et al. |
| 2010/0053370 A1* | 3/2010 | Crisan et al. ............... 348/231.2 |

FOREIGN PATENT DOCUMENTS

WO    2006040761    4/2006

OTHER PUBLICATIONS

International Search Report and Written Opinion from corresponding International Application No. PCT/IB10/001247.

\* cited by examiner

*Primary Examiner* — Nelson D. Hernández Hernández
(74) *Attorney, Agent, or Firm* — Renner, Otto, Boisselle & Sklar, LLP

(57) ABSTRACT

A database of user preferences for a high quality picture is maintained. Preferences may be generated over time by tracking attributes of pictures that the user has deleted or failed to select for storage. When the camera is in preview mode, the camera may automatically capture image data for one or more pictures as a background operation. When the user commands the taking of a picture, the camera will capture image data for a user photo. A comparison may be made to determine which one of the automatically taken picture or the user photo has a higher correlation to user preferences for a quality photo. If the user photo has higher correlation, it may be retained in the customary manner for digital pictures. If the automatically taken photo has higher correlation, the user may be given the option to select the user photo or the automatically taken photo for retention.

17 Claims, 2 Drawing Sheets

CAMERA SYSTEM AND METHOD FOR TAKING PHOTOGRAPHS THAT CORRESPOND TO USER PREFERENCES

TECHNICAL FIELD OF THE INVENTION

The technology of the present disclosure relates generally to photography and, more particularly, to a system and method for suggesting pictures of a scene that may have higher appeal to a user than a picture taken under user command.

BACKGROUND

Various physical attributes of digital cameras have undergone great improvement in recent years. These attributes include resolution, optics, auto-focus function, face and smile detection, and speed. Improvements in these areas have even been made for very small digital cameras, such as those found in mobile telephones. But physical camera attributes are only a contributing factor to picture quality. Many aspects of picture quality are subjective or depend on the photographer's skills.

SUMMARY

To improve the capturing of pictures that are subjectively perceived by the user to be of high quality, the present disclosure describes a camera apparatus and method of retaining pictures that correspond to user preferences. By accounting for user preferences, the apparatus and method accounts for subjective picture attributes regarding picture quality and resultant picture taking may rely less on the photographer's skill in using a camera.

The disclosed techniques include maintaining a database of user preferences for a high quality picture. These preferences may be generated over time by tracking attributes of pictures that the user has deleted or failed to select for storage. When the camera is in preview mode, the camera may automatically capture image data for one or more pictures as a background operation. When the user commands the taking of a picture, the camera will capture image data for a user photo. A comparison may be made to determine which one of the automatically taken picture or the user photo has a higher correlation to user preferences for a quality photo. If the user photo has higher correlation, it may be retained in the customary manner for taking digital pictures. If the automatically taken photo has higher correlation, the user may be given the option to select the user photo or the automatically taken photo for retention.

According to one aspect of the disclosure, a camera assembly includes a control circuit configured to analyze an image of a scene that was captured during composition of a user photo to determine if the image is a quality photo according to an assessment of attributes of the image against respective features that collectively represent user preferences regarding photo quality; capture the user photo in response to entry of a user command to capture the user photo; and if the image is a quality photo, display the image and the user photo for user selection of the image or the user photo to store as a picture of the scene in a memory of the camera assembly.

According to one embodiment of the camera assembly, the assessment of the image is carried out by combining a plurality of metrics that are scored for the image and that respectively relate to the features.

According to one embodiment of the camera assembly, the combination of the plurality of metrics is carried out by summing or weighted summing the scores for each metric.

According to one embodiment of the camera assembly, the score for each metric is established by assessing a degree of presence of the corresponding feature in the analyzed image.

According to one embodiment of the camera assembly, the assessment of the image is carried out by a neural network.

According to one embodiment of the camera assembly, the image and user photo are displayed for user selection only if the user image is not a quality photo according to the assessment.

According to one embodiment of the camera assembly, if the user image is a quality photo, the control circuit is configured to store the user photo as the picture of the scene in the memory of the camera assembly.

According to one embodiment of the camera assembly, the image and user photo are displayed for user selection only if the user image has a lower correspondence to the user preferences regarding photo quality than the image.

According to one embodiment of the camera assembly, if the user image has higher correspondence to user preferences regarding photo quality than the image, the control circuit is configured to store the user photo as the picture of the scene in the memory of the camera assembly.

According to one embodiment of the camera assembly, the features that collectively represent user preferences regarding photo quality are determined by evaluating photos that are deleted by user action for correlations in features that are indicative of undesirable photo characteristics to the user.

According to one embodiment of the camera assembly, the assessment of the image is carried out in accordance with a technique that is determined by evaluating photos that are deleted by user action for correlations in features that are indicative of undesirable photo characteristics to the user.

According to one embodiment of the camera assembly, the features that collectively represent user preferences regarding photo quality are determined by evaluating differences between photos that are selected by the user and photos that are not selected by the user for correlations in features that are indicative of undesirable photo characteristics to the user.

According to one embodiment of the camera assembly, the assessment of the image is carried out in accordance with a technique that is determined by evaluating differences between photos that are selected by the user and photos that are not selected by the user for correlations in features that are indicative of undesirable photo characteristics to the user.

According to one embodiment of the camera assembly, the features that collectively represent user preferences regarding photo quality are determined by evaluating user operation of the camera during composition of the user photo.

According to another aspect of the disclosure, a method of camera assembly operation includes analyzing an image of a scene that was captured during composition of a user photo to determine if the image is a quality photo according to an assessment of attributes of the image against respective features that collectively represent user preferences regarding photo quality; capturing the user photo in response to entry of a user command to capture the user photo; and if the image is a quality photo, displaying the image and the user photo for user selection of the image or the user photo to store as a picture of the scene in a memory of the camera assembly.

According to one embodiment of the method, the assessment of the image is carried out by combining a plurality of metrics that are scored for the image and that respectively relate to the features.

According to one embodiment of the method, the combination of the plurality of metrics is carried out by summing or weighted summing the scores for each metric.

According to one embodiment of the method, the score for each metric is established by assessing a degree of presence of the corresponding feature in the analyzed image.

According to one embodiment of the method, the assessment of the image is carried out by a neural network.

According to one embodiment of the method, the image and user photo are displayed for user selection only if the user image is not a quality photo according to the assessment.

According to one embodiment of the method, the image and user photo are displayed for user selection only if the user image has a lower correspondence to the user preferences regarding photo quality than the image.

According to one embodiment of the method, the features that collectively represent user preferences regarding photo quality are determined by at least one of evaluating photos that are deleted by user action for correlations in features that are indicative of undesirable photo characteristics to the user or evaluating differences between photos that are selected by the user and photos that are not selected by the user for correlations in features that are indicative of undesirable photo characteristics to the user.

According to one embodiment of the method, the assessment of the image is carried out in accordance with a technique that is determined by at least one of evaluating photos that are deleted by user action for correlations in features that are indicative of undesirable photo characteristics to the user or evaluating differences between photos that are selected by the user and photos that are not selected by the user for correlations in features that are indicative of undesirable photo characteristics to the user.

According to yet another aspect of the disclosure, a method of processing a digital picture includes analyzing attributes of an image for a degree of correspondence between the attributes and respective features that collectively represent user preferences regarding photo quality; and processing the image to increase the correspondence between the attributes and respective features that collectively represent user preferences regarding photo quality.

According to one embodiment of the method, the features that collectively represent user preferences regarding photo quality are determined by evaluating photos that are deleted by user action for correlations in features that are indicative of undesirable photo characteristics to the user.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

DETAILED DESCRIPTION OF EMBODIMENTS

Figure 1:
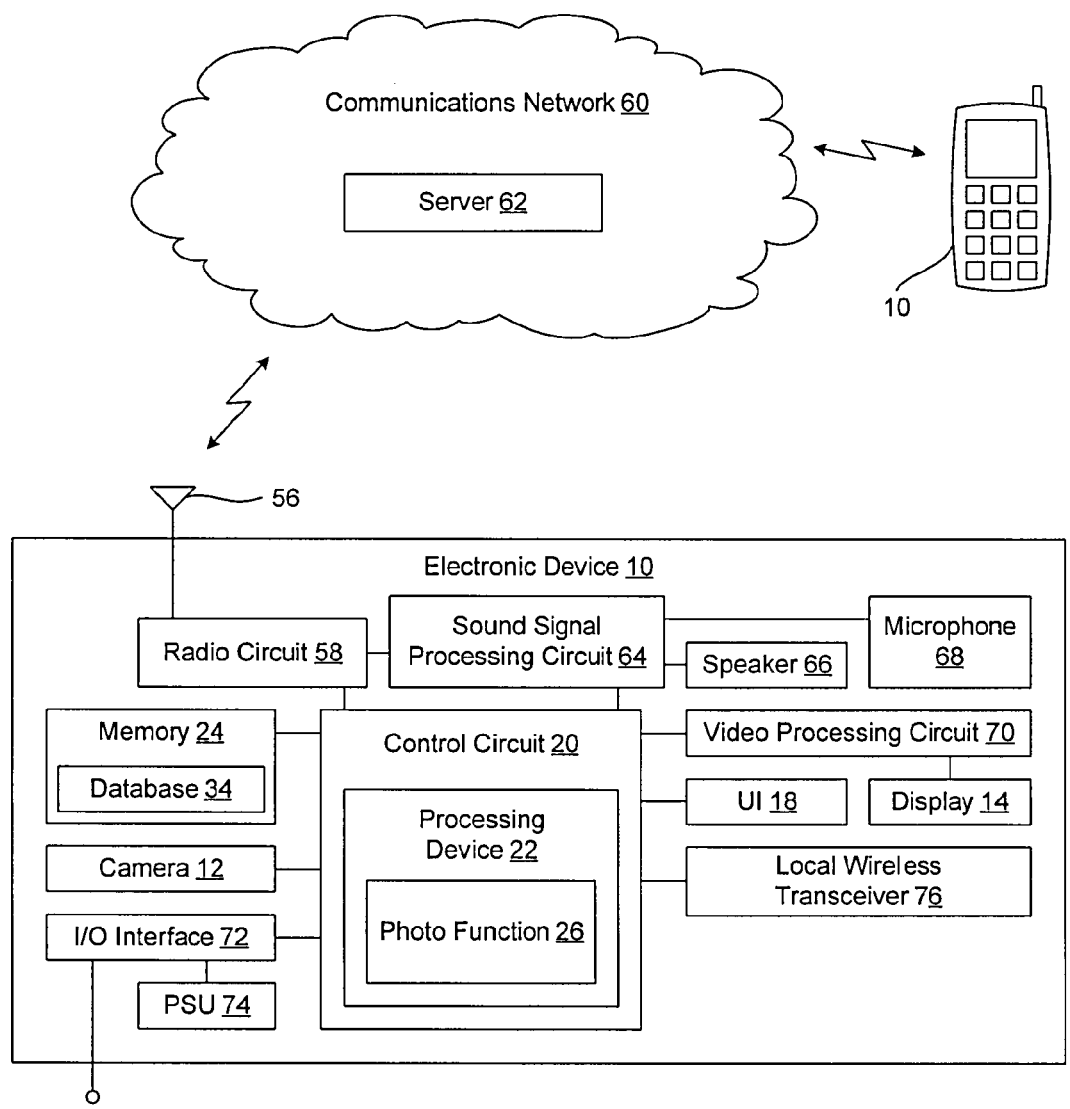
FIG. 1 is a schematic block diagram of a mobile telephone as an exemplary electronic device that includes a camera assembly.

Embodiments will now be described with reference to the drawings, wherein like reference numerals are used to refer to like elements throughout. It will be understood that the figures are not necessarily to scale.

Features that are described and/or illustrated with respect to one embodiment may be used in the same way or in a similar way in one or more other embodiments and/or in combination with or instead of the features of the other embodiments.

Described below in conjunction with the appended figures are various embodiments of improved camera systems and methods of camera operation. In the illustrated embodiments, the camera system is embodied as a digital camera assembly that is made part of a mobile telephone. It will be appreciated that the disclosed camera technology may be applied to other operational contexts such as, but not limited to, a dedicated camera or another type of electronic device that has a camera. Examples of these other devices include, but are not limited to a video camera, a navigation device (commonly referred to as a "GPS" or "GPS device"), a personal digital assistant (PDA), a media player (e.g., an MP3 player), a gaming device, a "web" camera, a computer (including a laptop, an "ultra-mobile PC" or other type of computer), and an accessory for another electronic device.

The camera assembly may be used to capture image data in the form of still images, also referred to by the terms pictures, photos, and photographs. It will be understood that the camera assembly also may be configured to capture video images in addition to still images.

Referring initially to FIG. 1 an electronic device 10 is shown. The illustrated electronic device 10 is a mobile telephone. The electronic device 10 includes a camera assembly 12 for taking digital still pictures and/or digital video clips. It is emphasized that the electronic device 10 need not be a mobile telephone, but could be a dedicated camera or some other device as indicated above.

The camera assembly 12 may be arranged as a typical camera assembly that includes imaging optics to focus light from a scene within the field of view of the camera assembly 12 onto a sensor. The sensor converts the incident light into image data. The imaging optics may include a lens assembly and components that that supplement the lens assembly, such as a protective window, a filter, a prism, and/or a mirror. To adjust the focus of the camera assembly 12, a focusing assembly that includes focusing mechanics and/or focusing control electronics may be present in conjunction with the imaging optics. A zooming assembly also may be present to optically change the magnification of captured images.

Other camera assembly 12 components may include a distance meter (also referred to as a rangefinder), a supplemental illumination source (e.g., a flash), a light meter, a display 14 for functioning as an electronic viewfinder, a user interface (UI) 18 (e.g., a keypad, buttons and/or a touch screen associated with the display 14) for accepting user inputs, an optical viewfinder, and any other components commonly associated with cameras. The user interface 18 may include a shutter input that the user may touch or depress to command the taking of a photograph.

Another component of the camera assembly 12 may be an electronic control circuit 20 that controls operation of the camera assembly 12. The control circuit 20 may be embodied, for example, to include a processor 22 that executes logical instructions that are stored by a memory of the control circuit or by a separate memory 24. Thus, the method of operating the camera assembly 12 may be physically embodied as executable code (e.g., software) that is stored on a computer readable medium in the form of a memory, or may be embodied as firmware. In one embodiment, the controller for the camera assembly 12 may be a dedicate controller for the camera assembly 12. In the illustrated embodiment, however, the control functions for the camera assembly 12 are carried out by the control circuit 20, which is also responsible for overall operation of the electronic device 10. In another embodiment, camera assembly 12 control functions may be distributed between a controller dedicated to the camera assembly 12 and the control circuit 20 for the entire electronic device 10.

The sensor of the camera assembly 12 may be used to capture data at a predetermined frame rate to generate a preview video signal that is displayed on the display 14 for operation as an electronic viewfinder to assist the user compose photographs.

Figure 2:
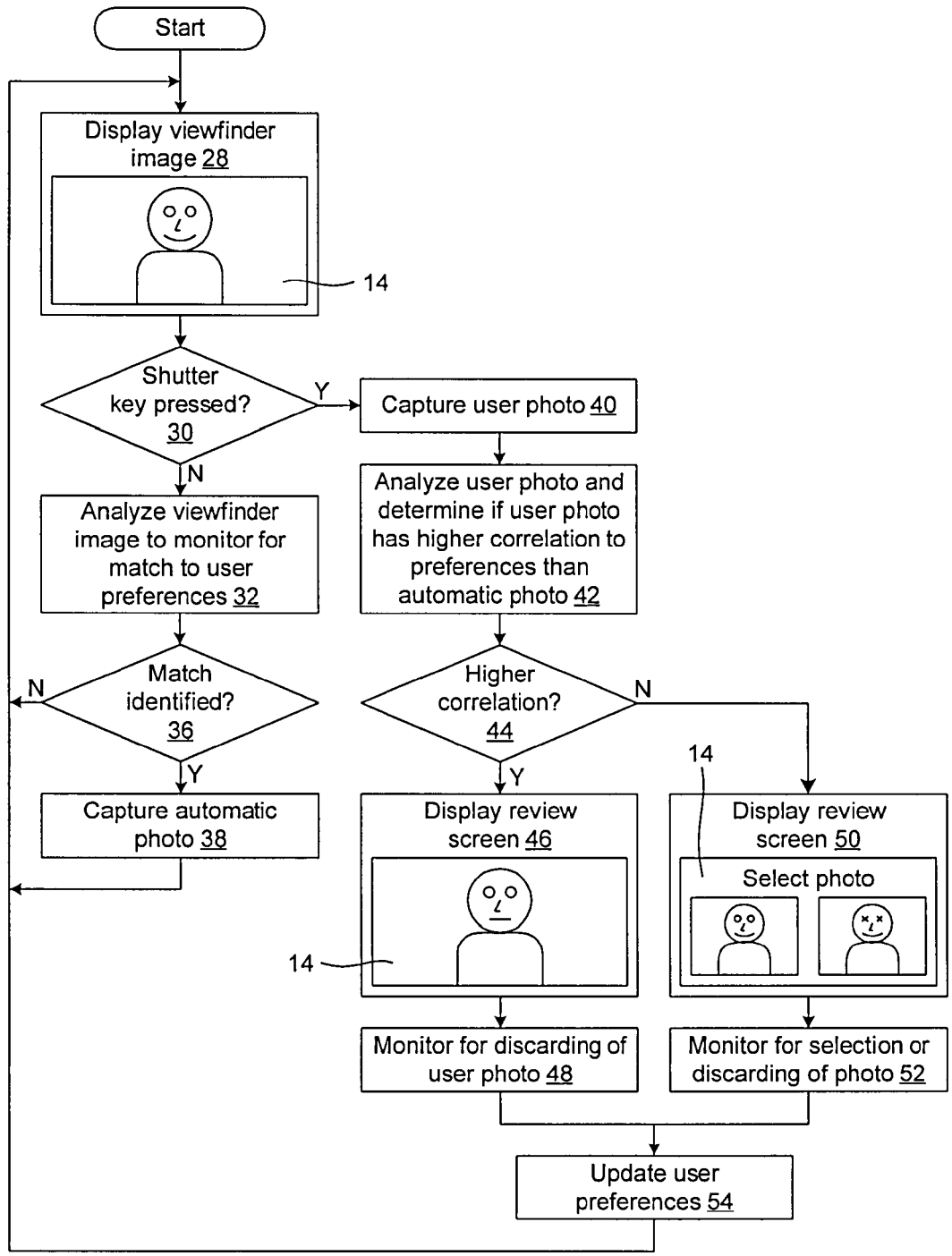
FIG. 2 is a flow chart representing an exemplary method of taking a photograph using the electronic device of FIG. 1.

With additional reference to FIG. 2, illustrated are logical operations to implement an exemplary method of operating the camera assembly 12. The exemplary method may be carried out by executing, for example, an embodiment of a photo function 26 that is embodied as executable code (software). Thus, the flow chart of FIG. 2 may be thought of as depicting steps of a method carried out by the electronic device 10. Although FIG. 2 shows a specific order of executing functional logic blocks, the order of executing the blocks may be changed relative to the order shown. Also, two or more blocks shown in succession may be executed concurrently or with partial concurrence. Certain blocks also may be omitted.

The logical flow may begin in block 28 where the camera assembly 12 is activated and the preview video signal is generated and displayed on the display 14. In the illustration of FIG. 2, block 28 includes an exemplary representation of the display 14 during use as an electronic viewfinder. In the illustration, the camera assembly 12 is used to compose a picture of an individual. It will be understood that other types of scenes or plural subjects may be photographed using the disclosed techniques.

In block 30, a determination may be made as to whether the shutter input to command taking of a picture has been pressed. If a negative determination is made, it is likely that the user is continuing to compose the desired photograph and the logical flow may proceed to block 32. In block 32, one or more frames of the preview video signal may be analyzed. In another embodiment, an image apart from the preview video signal may be captured as part of a background operation of the photo function 26 and this image may be analyzed in block 32. The analysis monitors for an image that corresponds to user preferences for picture quality. Techniques for determining user preferences will be described in greater detail below.

It is possible that a variety of techniques exist for determining whether an image has features that meet or exceed user preferences for a quality image. In one exemplary embodiment, correspondence of an image to user preferences for picture quality may be ascertained by comparing features of the image to predetermined feature metrics that are stored in a database 34. The database 34 may be stored in the memory 24. In one embodiment, the metrics may be scores for a variety of types of image features. Each feature, if recognized in the analyzed image frame, may be scored for the analyzed image frame. The identification of some features may have a positive effect on determining if a photo meets user preferences and the identification other features may have a negative effect on determining if a photo meets user preferences.

The individual feature scores for the image may be combined to determined a combined score using an appropriate technique, examples of which include, but are not limited to, adding the scores together, weighting the scores and then adding the weighted score together (i.e., a weighted sum technique depending on what features are found to be most important to the user), and averaging the individual scores. If the combined score exceeds a predetermined value, then a conclusion may be made that the image meets (or corresponds to) user preferences for picture quality. The degree to which the image analysis finds or does not find the feature may influence the score. For instance, a score may be a numerical value on a scale. In one embodiment, positively influencing features may receive a score with a positive number (e.g., a number ranging from one to ten or a number ranging from one to one hundred), and negatively influencing features may receive a score with a negative number (e.g., a number ranging from minus one to minus ten or a number ranging from minus one to minus one hundred). If a feature is not present in an analyzed image, the corresponding metrics may be given a zero score or not used when combining scores. For example, if the image is of scenery and does not contain people, a blinking (or eyes open) metric may not be used or may have a neutral value. In another example, the scores may be a binary values (e.g., yes the feature is present or no the feature is not present).

In one embodiment, there may be two or more metrics for certain types of features. For instance, some users may prefer photos of people who are serious and not smiling, and other users may prefer photos of people who are happy and smiling. To accommodate for these possible differences in user preferences, there may be a smiling metric and serious facial expression metric. Both or just one of the metrics for the same feature class may be given a score, depending on user preferences. Also, only scores for metrics that contribute user preferences for a quality photo may be used in the combining of individual metric scores.

In another approach, only negative influencing scores may be used. For instance, an image may start with a perfect score and then be reduced by any negative influencing scores.

As an example, one metric may be if a subject of the image is smiling. If the user prefers smiles, the serious facial express metric may not even be scored, or may be scored but not used during the calculation, or may be used in a calculation where negatively influencing parameters are taken into account. In this example, if the user is prefers smiling subjects, and a person in an analyzed photo is not smiling, then the score for the smiling metric will be low (e.g., equal to or less than three out of ten). But if a person in an analyzed photo is smiling, the score for the smiling metric will be high (e.g., equal to about five to seven out of ten for a small smile or grin, and equal to or more than eight out of ten for a large smile where teeth are shown). Opposite types of results may be found for the serious facial express score. The scores for these facial expression parameters may be combined with other scores to determine an amount of correspondence to user preferences for a quality photo.

It will be appreciated that other ways of assessing features that collectively represent user preferences regarding photo quality may be used to analyze an image to determine if the image is a quality image under the user preferences and/or to determine the degree (or amount) of correlation that the image has to the user preferences. For example, a neural network may be employed to process image information, learn from the processed information, remember the learned information, and generate assessment results. In one embodiment, the neural network may be initially trained using a collection of photographs known to be of high quality. These photographs may be selected by the user or may be identified by one or more persons that are skilled in analyzing photographs. The neural network may then be retrained and refined over time using information from user selected photos, deleted photos and other data sources as described in greater detail in the following portions of this document.

The features that may be considered may include be any feature for which the photo function 26 is capable of analyzing. Exemplary features include, but are not limited to, facial expression (e.g., smiling, serious, surprised, etc.), eye blinking (e.g., degree to which a person's eyes are open or closed), head tilt, image brightness, image focus including whether any objects are in focus and location of focused objects in the image (e.g., one or more objects are in focus, a person is in focus, or a percentage of the image that is in focus), size of a person in the image, position of a person or other object in the image (e.g., closeness of the subject to a center point in the photo), blur (e.g., whether camera movement or subject movement caused distortion), presence of starbursts or highlights, sharpness, coloring, contrast ratio, and so forth.

With continuing reference to FIGS. 1 and 2, a determination may be made in block 36 as to whether an analyzed image matches the user's preferences to an extent where the image may be found to be of high quality to the user. If a positive determination may be made in block 36, the logical flow may proceed to block 38. In block 38, the image may be retained in the memory 24 as an automatically captured photo. The capturing of the automatically captured photo may occur as part of background processing and the user may be unaware that the automatically captured photo was captured. After block 38, or following a negative determination in block 36, the logical flow may return to block 28 to continue the display of the electronic viewfinder and carry out analysis of one or more future images.

Returning to block 30, if a positive determination is made, then the logical flow may proceed to block 40. In block 40, the camera 12 may capture a photo and store the image in the memory 24. This image was captured in response to a user command input to capture the image. Therefore, this image may be referred to as a user photo.

Next, in block 42, analysis may be made to determine if the user photo or the photo stored in block 38 has a better match to the user preferences for a quality photo. In one embodiment, the user photo may be scored using the foregoing techniques to score the image analyzed in block 32. The user photo or the automatically captured photo with the higher score may be considered to be the photo with higher correlation, or match, to the user preferences for a quality photo. It may be possible that plural automatically captured photos were stored by plural iterations of block 38. In this case, the user photo may be compared with the automatically captured photo that has the highest score of the automatically captured photos.

A positive determination may be made in block 44 if the user photo is of higher quality, according to user preferences, than the automatically captured photo. Alternatively, a positive determination may be made in block 44 if the user photo meets minimum qualifications for a quality photo. For example, if the score for the user photo is greater than a predetermined threshold (e.g., the threshold used to identify a match in block 30), then a positive determination in block 44 may be made without making a comparison to the automatically captured photo.

Following a positive determination in block 44, the logical flow may proceed to block 46. In block 46, a review screen may be displayed. In the attached drawing, block 46 includes an exemplary representation of the display 14 during use to show the review screen. The review screen may show the user photo. In the illustrated embodiment, the user photo is of a person with a serious facial expression. Any photos captured in block 38 may be automatically deleted when a positive determination is made in block 44. Alternatively, the user may be provided with an option to review and retain one or more automatically captured photos.

Next, in block 48, monitoring may be made to determine if the user photo is deleted. As will be discussed below, deletion of a photo may be indicative of one or photo attributes that contributes to low photo quality in the opinion of the user. The monitoring may last for the period during which the photo is displayed on the review screen and/or for a predetermined amount of time thereafter (e.g., about one minute to about 20 minutes). In other embodiments, the monitoring may last indefinitely, as long as the photo is not deleted as part of a mass deletion of photos to recover space in the memory 24.

A negative determination may be made in block 44 if the user photo is of lower quality, according to user preferences, than the automatically captured photo. Alternatively, a negative determination may be made in block 44 if the user photo does not meet minimum qualifications for a quality photo. Following a negative determination in block 44, the logical flow may proceed to block 50. In block 50, a review screen may be displayed. In the attached drawing, block 50 includes an exemplary representation of the display 14 during use to show the review screen. The review screen may show the user photo and the automatically captured photo. In the illustrated embodiment, the user photo is of a person with closed eyes (the photo on the right in the drawing) and the automatically captured photo is of the person with open eyes (the photo on the left in drawing). It is possible that plural automatically captured photos were stored by plural iterations of block 38. In this case, the user photo may be shown with the automatically captured photo that has the highest score of the automatically captured photos. Alternatively, more than one automatically captured photo may be displayed as part of the preview screen.

The user may be prompted to select one of the photos for retention. Each unselected photo may be automatically deleted. Alternatively, the user may be provided with an option to retain or manually delete any unselected photos.

In block 52, monitoring may be made to determine which photo is selected and to determine if the user deletes any of the photos, including the selected photo or any unselected photos. The monitoring may last for the period during which the photo is displayed on the review screen and/or for a predetermined amount of time thereafter (e.g., about one minute to about 20 minutes). In other embodiments, the monitoring may last indefinitely, as long as the photo is not deleted as part of a mass deletion of photos to recover space in the memory 24. In still other embodiments, the photos may be transferred to another device that conducts the described analysis and functions. The device may be, for example, a personal computer or a server that hosts a service to carry out the described functionality. This service may use information collected from more than one user in the execution of the functionality.

Following blocks 48 and 52, the user preferences regarding quality photographs may be updated in block 54. The updating may include evaluating the deleted photo(s) to determine which features may have contributed to the user discarding the photo. Also, the updating may include evaluating a selected photo when two or more photos are presented to the user for selection. The tracking and analysis of selected photos may be made even if two or more of the presented photos are quality photos. In one approach, differences between selected photos and unselected photos from blocks 50 and 52 may be evaluated to determine which features may have contributed to the selection. For instance, if a user regularly deletes photos where persons appear small in comparison to the field of view for the photo, then a determination may be made that the user prefers photos with people that appear large in the photo. As another example, if the user frequently selects pictures with high contrast ratio over pictures with lower contrast ratio, then a determination may be made that the user prefers photos with a high contrast ratio. Similar correlations for each feature for which the photo function 26 is capable of analyzing may be made. Examples of those features are described above.

In addition to identifying correlations among deleted photos, correlations among photos that were or were not selected, and correlations in the differences between selected photos to unselected photos, other user actions may be monitored and correlations for features from photos subject to those actions may be identified. For example, some actions may indicate that a photo is considered by the user to be of high quality. Those actions may include, for example, tagging the photo with additional information (e.g., a subject's name or a location), emailing the photo to others, frequently viewing the photo, and so forth. Another indicator of photo quality may be derived from how frequently the photo is viewed and/or commented upon by others through an Internet-based service or social media website.

Correlations and information derived from other user action also may be used during the operations of block 54. For example, the active process of image composition by the user may contain information about user preferences. In the moments leading up to user activation of the camera shutter control input, the user may move the camera relative to a scene, adjust focus, adjust zoom, turn on or off a flash, and/or make other adjustments. Analysis of these user actions may reveal a pattern of camera use. For instance, the user may commonly move the camera up or down to respectively increase or decrease the amount of background scenery appearing above the heads of persons in the field of the view of the camera. The amount of scenery about subjects' heads may be referred to as "headroom." This action may correspond to the user's preferences regarding positioning of subjects in photos, and specifically how much headroom the user prefers. Further analysis of correlations between the observed user actions during image composition and user actions after image capture in terms of photo deletion or photo selection may reveal additional information regarding user preferences. These correlations may reinforce the composition actions or may be indicative of preferences contrary to the composition action. For instance, composition actions may routinely include adding a significant amount of headroom, but it may be found that the user tends to delete photos with a large amount of headroom. In this case, the user preferences may guide the taking of the automatically captured photo when there is a relatively small amount of headroom in the field of view of the camera.

Another information source for establishing user preferences is user eye gaze when viewing the preview images. A second camera assembly may be included in the electronic device to capture a video image of the user. For instance, a camera assembly used for video telephony may be used for this purpose. The video image may be analyzed to determine where the user tends to look when assessing an image for deletion or selection, and determine if there is an order to the behavior. For instance, it may be found that the user first looks at eyes of people in the photo, then to the edges of the photo, and then to the amount of headroom.

From the correlations made during the analysis of block 54, updates may be made to improve and refine the identification of images that match user preferences and the degree to which an image matches user preferences. In the case of a neural network, the adjustments may be made in accordance with the inherent behavior of the neural network. Other implementations may employ other types of adjustments. One example way to update this identification process is to adjust weighting values that are used when combining metric values for the features. The weighting values may be used as an indicator of which features are most important or least important to user perceptions of photo quality. Another example way to update this identification process is to revise which metric values to use when determining a score for a photo. Another example way to update this identification process is to revise the manner in which score values are generated for each metric. For instance, if the user seems willing to accept photos with a small grin, then the scoring for a smile metric may be made more tolerant so that "small" smiles will receive a relatively high score. Adjustments to the identification process may be made using one technique or using multiple techniques, and/or may be made in different ways for different metrics or features.

According to one aspect of the disclosed subject matter, the techniques assist the user take "better" pictures since pictures are analyzed for a match to the user's perception of what constitutes a quality picture. As part of the technique, analysis is made of deleted photos. Without being bound by theory, it is believed that intentionally deleted photos contain highly relevant information about the kinds of images that the user does not want due to low image quality under the assumption that deleting a photo is considered a "stronger" decision than keeping a photo.

The photo function 26 may be initially programmed with default settings as to quality photos, such as parameters that indicate that at least one object in the photo should be in focus, that the photo should not be "all black" or "all blurry," and that if a person is present in the photo, then the subject's eyes should be open. As the user takes photos and starts to delete certain photos, the settings may be revised to take individual user preferences into account by identifying correlations for various features and "learning" what features the user does and/or does not like. Using the parameters related to user preferences, the engine of the photo function 26 may continuously analyze a frame buffer that contains output information from the sensor of the camera assembly 12 to identify photos that have high potential to match user preferences, and at least temporarily keep the matching photos for user evaluation. If a user taken photo has a match to the user preferences, then photo functionality may continue as if the disclosed functionality were not present in the electronic device 10. But if the user taken photo has one or more aspects that are not in accordance with what the user normally prefers, then the user may be presented with an array of photos from which to choose.

In another embodiment, the metrics representing user preferences may be used to adjust an existing photo using post-processing to increase the photo's correspondence to user perception of a quality photo. For example, composition of the photo may be adjusted cropping the image to enlarge a person's face. Other possible adjustments may be modifications to brightness, reduction in the presence of red-eye, and so forth.

Additional details of the electronic device 10 when configured as a mobile telephone will now be described. In this embodiment, the electronic device 10 includes communications circuitry that enables the electronic device 10 to establish communications with another device. Communications may include calls, data transfers, and the like. Calls may take any suitable form such as, but not limited to, voice calls and video calls. Data transfers may include, but are not limited to, receiving streaming content, downloading and/or uploading data, receiving or sending messages, and so forth. This data may be processed by the electronic device 10, including storing the data in the memory 24, executing applications to allow user interaction with the data, displaying video and/or image content associated with the data, outputting audio sounds associated with the data, and so forth.

In the exemplary embodiment, the communications circuitry may include an antenna 56 coupled to the radio circuit 58. The radio circuit 58 may include a radio frequency transmitter and receiver for transmitting and receiving signals via the antenna 56. The radio circuit 58 may be configured to operate in a mobile communications system. Radio circuit 58 types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMAX, integrated services digital broadcasting (ISDB), and/or high speed packet access (HSPA), as well as advanced versions of these standards or any other appropriate standard. It will be appreciated that the electronic device 10 may be capable of communicating using more than one standard. Therefore, the antenna 56 and the radio circuit 58 may represent one or more than one radio transceiver.

The electronic device 10 may communicate with a communications network 60 that has a server 62 (or servers) for managing calls placed by and destined to the electronic device 10, transmitting data to and receiving data from the electronic device 10 and carrying out any other support functions. The electronic device 10 communicates with the network 60 via a transmission medium. The transmission medium may be any appropriate device or assembly, including, for example, a communications base station (e.g., a cellular service tower, or "cell" tower), a wireless access point, a satellite, etc. The network 60 may support the communications activity of multiple electronic devices 10 and other types of end user devices. As will be appreciated, the server 62 may be configured as a typical computer system used to carry out server functions and may include a processor configured to execute software containing logical instructions that embody the functions of the server 62 and a memory to store such software. In alternative arrangements, the electronic device 10 may wirelessly communicate directly with another electronic device 10 (e.g., another mobile telephone or a computer) through a local network or without an intervening network.

As indicated, the electronic device 10 may include a primary control circuit 20 that is configured to carry out overall control of the functions and operations of the electronic device 10. The processing device 22 of the control circuit 20 may be a central processing unit (CPU), a microcontroller or a microprocessor. The processing device 20 executes code stored in a memory (not shown) within the control circuit 20 and/or in a separate memory, such as the memory 24, in order to carry out operation of the electronic device 10. For instance, the memory within the control circuit 20 and/or the memory 24 may store executable code that embodies the photo function 26 and the processing device 22 may execute that code so that the control circuit 20 is configured to implement the functions of the photo function 26. The memory 24 may be, for example, one or more of a buffer, a flash memory, a hard drive, a removable media, a volatile, memory, a non-volatile memory, a random access memory (RAM), or other suitable device. In a typical arrangement, the memory 24 may include a non-volatile memory for long term data storage and a volatile memory that functions as system memory for the control circuit 20. The memory 24 may exchange data with the control circuit 20 over a data bus. Accompanying control lines and an address bus between the memory 24 and the control circuit 66 also may be present.

The electronic device 10 further includes a sound signal processing circuit 64 for processing audio signals transmitted by and received from the radio circuit 22. Coupled to the sound processing circuit 64 are a speaker 66 and the microphone 68 that enable a user to listen and speak via the electronic device 10. The radio circuit 58 and sound processing circuit 64 are each coupled to the control circuit 20 so as to carry out overall operation. Audio data may be passed from the control circuit 20 to the sound signal processing circuit 64 for playback to the user. The sound processing circuit 64 may include any appropriate buffers, encoders, decoders, amplifiers and so forth.

The display 14 may be coupled to the control circuit 20 by a video processing circuit 70 that converts video data to a video signal used to drive the display 14. The video processing circuit 70 may include any appropriate buffers, decoders, video data processors and so forth.

The electronic device 10 may further include one or more input/output (I/O) interface(s) 72. The I/O interface(s) 72 may be in the form of typical mobile telephone I/O interfaces and may include one or more electrical connectors. The I/O interfaces 72 may form one or more data ports for connecting the electronic device 10 to another device (e.g., a computer) or an accessory (e.g., a personal handsfree (PHF) device) via a cable. Further, operating power may be received over the I/O interface(s) 72 and power to charge a battery of a power supply unit (PSU) 74 within the electronic device 10 may be received over the I/O interface(s) 72. The PSU 74 may supply power to operate the electronic device 10 in the absence of an external power source.

The electronic device 10 also may include various other components. For example, a local transceiver 76, such as an RF transceiver (e.g., a Bluetooth chipset), may be present to establish communication with a nearby device, such as an accessory (e.g., a headset), another mobile radio terminal, a computer or another device.

Although certain embodiments have been shown and described, it is understood that equivalents and modifications falling within the scope of the appended claims will occur to others who are skilled in the art upon the reading and understanding of this specification.

What is claimed is:

1. A camera assembly, comprising a control circuit configured to:
    control the automatic capture of a first photo of a scene while a user composes a second photo;
    control capture of the second photo of the scene in response to entry of a user command to capture the second photo;
    analyze the first photo to determine if the first photo is a quality photo according to an assessment of attributes of the first photo against respective features that collectively represent user preferences regarding photo quality; and
    if the first photo is a quality photo, display the first photo and the second photo for user selection of one of the first photo or the second photo to store as a picture of the scene in a memory of the camera assembly; and
    wherein the first photo and the second photo are displayed for user selection only if the second photo is not a quality photo according to an assessment of attributes of the second photo against respective features that collectively represent user preferences regarding photo quality.

2. The camera assembly of claim 1, wherein the assessment of the first photo is carried out by combining a plurality of metrics that are scored for the first photo and that respectively relate to the features.

3. The camera assembly of claim 2, wherein the combination of the plurality of metrics is carried out by summing or weighted summing the scores for each metric.

4. The camera assembly of claim 3, wherein the score for each metric is established by assessing a degree of presence of the corresponding feature in the analyzed first photo.

5. The camera assembly of claim 1, wherein if the second photo is a quality photo, the control circuit is configured to store the second photo as the picture of the scene in the memory of the camera assembly.

6. The camera assembly of claim 1, wherein the features that collectively represent user preferences regarding photo quality are determined by evaluating photos that are deleted by user action for correlations in features that are indicative of undesirable photo characteristics to the user.

7. The camera assembly of claim 1, wherein the features that collectively represent user preferences regarding photo quality are determined by evaluating differences between photos that are selected for storage by the user and photos that are not selected by the user for correlations in features that are indicative of undesirable photo characteristics to the user.

8. The camera assembly of claim 1, wherein capture of the first photo is triggered by analyzing an image stream used to drive an electronic viewfinder of the camera assembly for a match to user preferences regarding photo quality.

9. A camera assembly, comprising a control circuit configured to:
control the automatic capture of a first photo of a scene while a user composes a second photo;
control capture of the second photo of the scene in response to entry of a user command to capture the second photo;
analyze the first photo to determine if the first photo is a quality photo according to an assessment of attributes of the first photo against respective features that collectively represent user preferences regarding photo quality; and
if the first photo is a quality photo, display the first photo and the second photo for user selection of one of the first photo or the second photo to store as a picture of the scene in a memory of the camera assembly; and
wherein the first photo and the second photo are displayed for user selection only if the second photo has a lower correspondence to the user preferences regarding photo quality than the first photo.

10. The camera assembly of claim 9, wherein if the second photo has higher correspondence to user preferences regarding photo quality than the first photo, the control circuit is configured to store the second photo as the picture of the scene in the memory of the camera assembly.

11. A method of camera assembly operation, comprising:
automatically capturing a first photo of a scene while a user composes a second photo;
capturing the second photo of the scene in response to entry of a user command to capture the second photo;
analyzing the first photo to determine if the first photo is a quality photo according to an assessment of attributes of the first photo against respective features that collectively represent user preferences regarding photo quality; and
if the first photo is a quality photo, displaying the first photo and the second photo for user selection of one of the first photo or the second photo to store as a picture of the scene in a memory of the camera assembly; and
wherein the first photo and the second photo are displayed for user selection only if the second photo is not a quality photo according to an assessment of attributes of the second photo against respective features that collectively represent user preferences regarding photo quality.

12. A method of camera assembly operation, comprising:
automatically capturing a first photo of a scene while a user composes a second photo;
capturing the second photo of the scene in response to entry of a user command to capture the second photo;
analyzing the first photo to determine if the first photo is a quality photo according to an assessment of attributes of the first photo against respective features that collectively represent user preferences regarding photo quality; and
if the first photo is a quality photo, displaying the first photo and the second photo for user selection of one of the first photo or the second photo to store as a picture of the scene in a memory of the camera assembly; and
wherein the first photo and the second photo are displayed for user selection only if the second photo has a lower correspondence to the user preferences regarding photo quality than the first photo.

13. The method of claim 12, wherein the assessment of the first photo is carried out by combining a plurality of metrics that are scored for the first photo and that respectively relate to the features.

14. The method of claim 13, wherein the combination of the plurality of metrics is carried out by summing or weighted summing the scores for each metric.

15. The method of claim 14, wherein the score for each metric is established by assessing a degree of presence of the corresponding feature in the analyzed first photo.

16. The method of claim 12, wherein the features that collectively represent user preferences regarding photo quality are determined by at least one of evaluating photos that are deleted by user action for correlations in features that are indicative of undesirable photo characteristics to the user or evaluating differences between photos that are selected for storage by the user and photos that are not selected by the user for correlations in features that are indicative of undesirable photo characteristics to the user.

17. The method of claim 12, wherein capture of the first photo is triggered by analyzing an image stream used to drive an electronic viewfinder of the camera assembly for a match to user preferences regarding photo quality.

* * * * *